(12) United States Patent
Fechner et al.

(10) Patent No.: US 7,976,062 B2
(45) Date of Patent: Jul. 12, 2011

(54) AIRBAG MODULE WITH AN AIRBAG AND A TUBULAR GAS GENERATOR THAT CAN BE FASTENED TO A MODULE HOUSING

(75) Inventors: Tobias Fechner, Aschaffenburg (DE); Sebastian Meisenzahl, Haibach (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/805,428

(22) Filed: Jul. 30, 2010

(65) Prior Publication Data
US 2010/0295274 A1 Nov. 25, 2010

Related U.S. Application Data

(63) Continuation of application No. PCT/EP2009/059414, filed on Jul. 22, 2009.

(30) Foreign Application Priority Data

Aug. 20, 2008 (DE) .......................... 10 2008 039 181

(51) Int. Cl.
*B60R 21/217* (2006.01)
(52) U.S. Cl. ..................................... 280/741; 280/728.2
(58) Field of Classification Search ............... 280/728.2, 280/732, 741
See application file for complete search history.

(56) References Cited

U.S. PATENT DOCUMENTS

| | | | |
|---|---|---|---|
| 5,356,175 A * | 10/1994 | Rose et al. ................. | 280/728.2 |
| 5,458,362 A | 10/1995 | Buchanan et al. | |
| 5,487,556 A | 1/1996 | Jenkins et al. | |
| 5,582,423 A * | 12/1996 | Rion et al. ................. | 280/728.2 |
| 5,611,563 A | 3/1997 | Olson et al. | |
| 5,620,200 A | 4/1997 | Garner et al. | |
| 5,810,386 A * | 9/1998 | Kelley et al. ............... | 280/728.2 |
| 5,887,891 A | 3/1999 | Taguchi et al. | |
| 7,784,817 B2 * | 8/2010 | Choi et al. ................. | 280/728.2 |
| 7,806,429 B2 * | 10/2010 | Fangmann et al. ......... | 280/728.2 |
| 2002/0024197 A1 * | 2/2002 | Thomas et al. ............ | 280/728.2 |
| 2005/0110246 A1 * | 5/2005 | Schneider .................. | 280/728.2 |
| 2005/0225058 A1 * | 10/2005 | Braun ........................ | 280/728.2 |
| 2008/0129019 A1 | 6/2008 | Fangmann et al. | |

(Continued)

FOREIGN PATENT DOCUMENTS

DE 695 08 148 T2 12/1995

(Continued)

OTHER PUBLICATIONS

Office Action (Reasons of Rejection) in JP Appln No. 2010-549162 dated Mar. 7, 2011.

*Primary Examiner* — Paul N Dickson
*Assistant Examiner* — Timothy D Wilhelm
(74) *Attorney, Agent, or Firm* — Foley & Lardner LLP

(57) ABSTRACT

An airbag module comprising an airbag and a tubular gas generator that can be fastened to a module housing is provided. Said gas generator having gas outlet openings along the periphery thereof. The tubular gas generator can be fastened to the module housing using two clamp rings which can move along the tubular gas generator and along sections of the module housing. The module housing comprises an opening at the base thereof for introducing the tubular gas generator. A support for the tubular gas generator is disposed at the module housing below said opening, wherein the support has a smaller length than the tubular gas generator.

12 Claims, 5 Drawing Sheets

U.S. PATENT DOCUMENTS

2009/0194977 A1    8/2009    Sahm

FOREIGN PATENT DOCUMENTS

| | | |
|---|---|---|
| DE | 195 33 707 A1 | 3/1996 |
| DE | 197 43 615 A1 | 4/1999 |
| DE | 299 21 416 U1 | 5/2000 |
| DE | 100 56 835 A1 | 6/2001 |
| DE | 102 25 032 A1 | 1/2004 |
| DE | 103 20 008 B3 | 9/2004 |
| DE | 20 2005 019 368 U1 | 3/2006 |
| DE | 10 2005 004 286 A1 | 8/2006 |
| DE | 10 2006 034 740 A1 | 1/2008 |
| EP | 0 782 943 A2 | 7/1997 |
| JP | 3037229 | 2/1997 |

\* cited by examiner

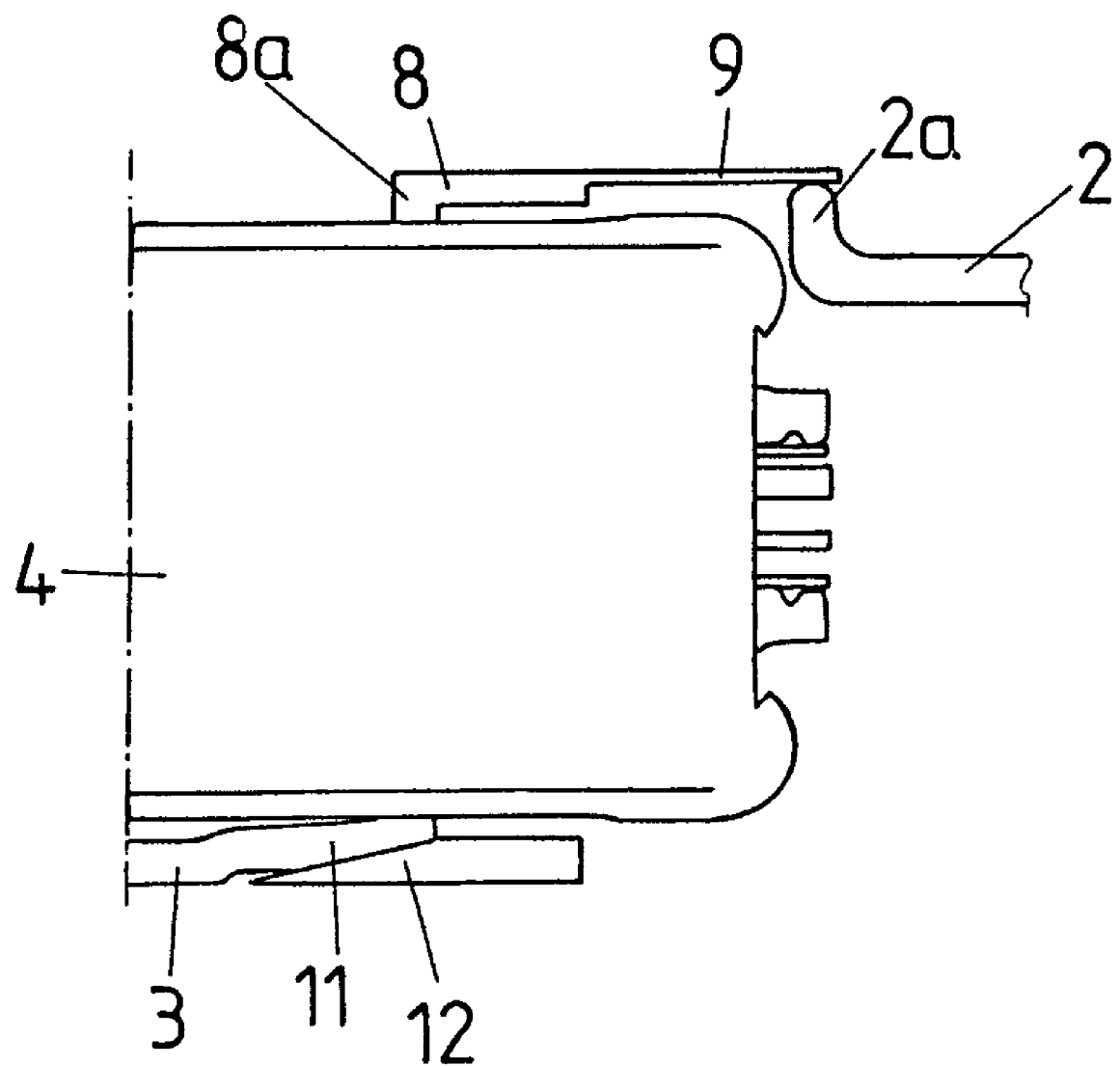

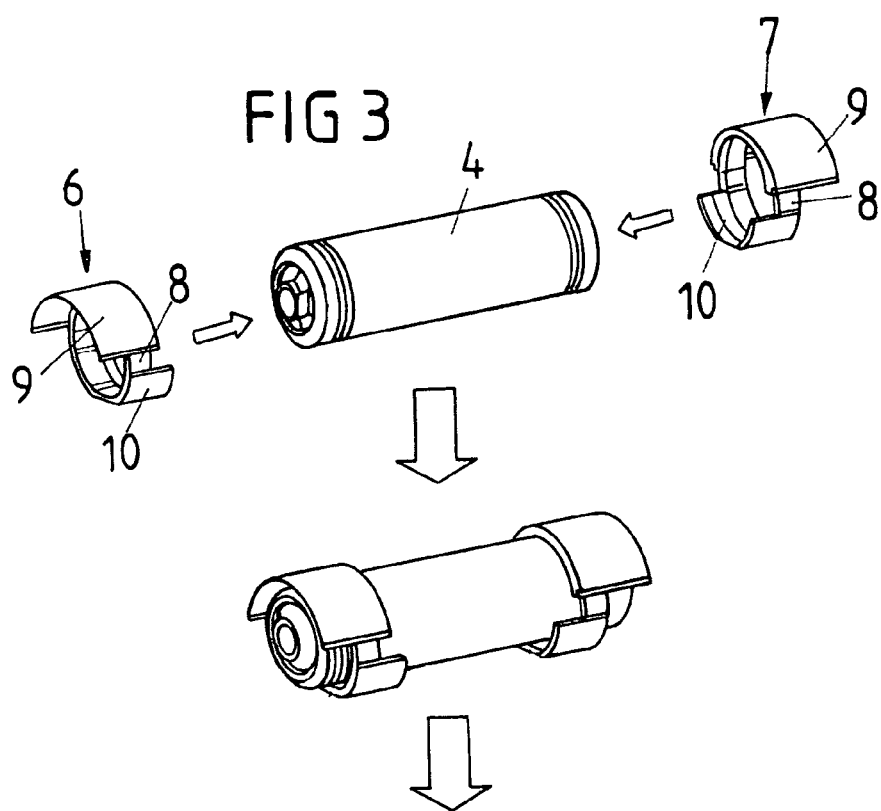
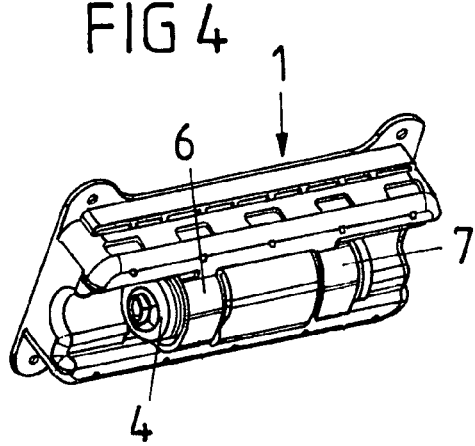
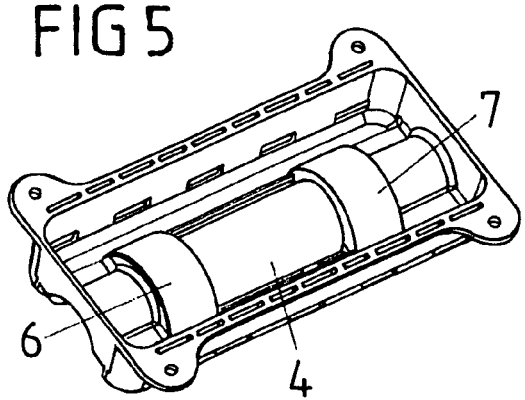

US 7,976,062 B2

AIRBAG MODULE WITH AN AIRBAG AND A TUBULAR GAS GENERATOR THAT CAN BE FASTENED TO A MODULE HOUSING

CROSS-REFERENCE TO RELATED PATENT APPLICATIONS

This application is a Continuation of International Application PCT/EP2009/059414, filed Jul. 22, 2009, which was published in German on Feb. 25, 2010 as WO 2010/020511 A1. The foregoing International Application is incorporated herein by reference in its entirety.

BACKGROUND

The invention relates to an airbag module with a tubular gas generator that can be fastened to its module housing.

An airbag module is known from DE 10 2005 004 286 A1 in which a tubular gas generator is fastened at one end by the means of a holding device which has a fixing ring arranged in a gap of a diffuser housing wall and a gas generator wall. This fixing ring encloses the gas generator. The other free end of the gas generator arranged opposite to the fixing ring is provided with gas outflow openings and engages in conventional way during insertion on a block or the face wall of a diffuser housing. This arrangement requires a cavity continuing along the module housing which requires a specific large and expensive molding tool.

SUMMARY

The object of the invention is to provide a fixing device for a tubular gas generator which comprises gas outflow openings on its periphery.

In case of an airbag module with an airbag and a tubular gas generator that can be fastened to a module housing, said gas generator having gas outlet openings along the periphery thereof, the tubular gas generator can be fastened to the module housing using two clamp rings which can be moved along the tubular gas generator and along sections of a module housing according to an exemplary embodiment of the invention. Furthermore, the module housing comprises an opening at the base for inserting the tubular gas generator, wherein a support for the tubular gas generator is provided at the module housing below said opening, wherein the support has a smaller length than the tubular gas generator, and wherein the clamp rings are designed such that upon moving the rings axially towards the centre of the tubular gas generator an extended section of the clamp rings grasps underneath the support on one side and the other extended section grasps above the base of the module housing on the other side after the tubular gas generator is positioned.

This arrangement allows in a simple manner the fastening of a tubular gas generator wherein said fastening type requires little constructing space. Thereby, the tubular gas generator is inserted into the module housing from above, e.g. from the storing space of the airbag. A further advantage is that a fastening of the tubular gas generator is possible irrespectively on its length and allows a simplified production.

The clamp rings are adapted to the geometry of the tubular gas generator and the module housing and are provided with extended sections separated from each other in axial direction and continuing axially in opposite directions.

A middle section and the lower extended section of the clamp rings assigned to the support have together a length which is smaller than the distance of the edges of the base and the edges of the support in direction of the longitudinal axis of the tubular gas generator.

It is appropriate if the extended section of the clamp rings grasping above the base of the module housing has a smaller thickness than a middle section of the clamp rings. Provided that no gap is present between the base and the extended section said section can thus be elastically deformed so that a moving of the rings is possible without problems.

The extended section of the clamp rings grasping underneath the support has also in one embodiment a smaller thickness than the middle section of the clamp rings in order to allow the fastening of the tubular gas generator in the area of the support by elastic deformation of said section.

It is of an advantage that on the one hand the clamp rings and the module housing are designed such that a sealing between them on edges of the base occurs and that on the other hand the clamp rings and the module housing are designed such that the sealing between them and the tubular gas generator is obtained on edges of the support and on edges of the upper sections of the clamp rings.

Although a sufficient fastening of the tubular gas generator to the module housing is already possible by using the clamp rings, the clamp rings can be additionally interlocked with the module housing. For this purpose, the module housing can be provided with at least one latch nose and the clamp ring can be provided with at least one assigned deformable latch hook. In a preferred embodiment two latch noses with assigned deformable latch hooks are arranged.

The fastening of the airbag can occur in different manners. It is possible that the airbag entangles the tubular gas generator and is fastened in the clamping position of the clamp rings between the tubular gas generator and the support.

Furthermore, a vacuum-folded airbag can be separately fastened to the module housing.

BRIEF DESCRIPTION OF THE DRAWINGS

The invention is being explained in examples by the means of the drawings.

FIG. 2 shows an enlarged section of FIG. 1 with the right side of the module housing and a modified fastening of the tubular gas generator.

FIG. 3 shows a display of the assembly steps.

FIG. 4 shows a perspective view of the module housing from below with tubular gas generator fastened to it.

FIG. 5 shows a perspective view of the module housing from above with a tubular gas generator fastened to it.

DETAILED DESCRIPTION

Figure 1:
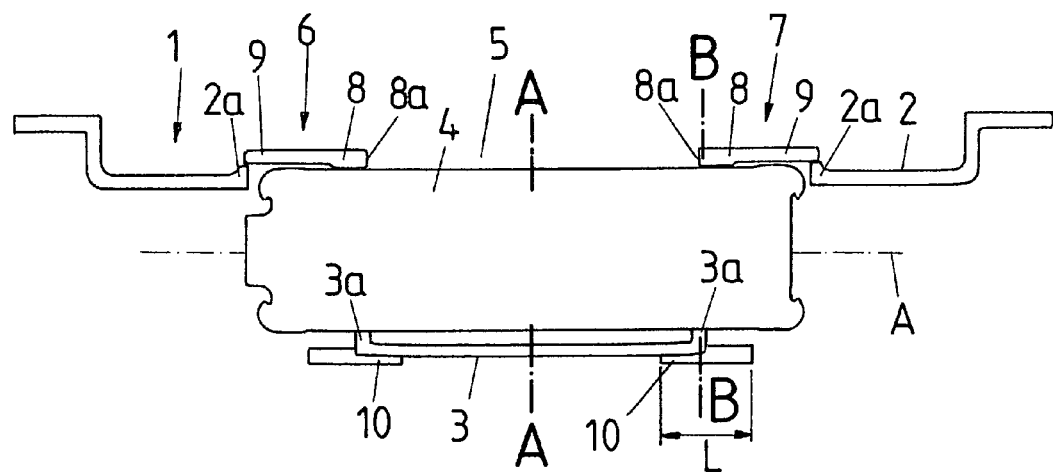
FIG. 1 shows a longitudinal section of the lower area of module housing with a tubular gas generator fastened to it.
Figure 1A:
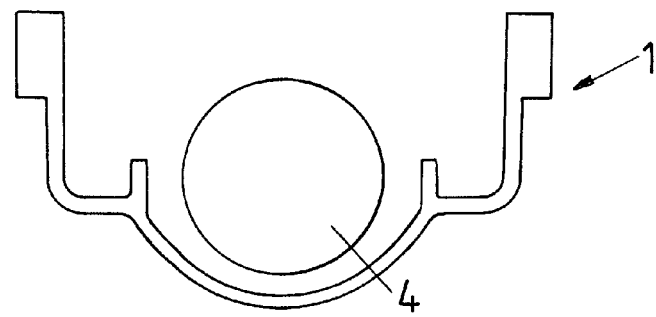
FIG. 1A shows a section along the line A-A of FIG. 1.
Figure 1B:
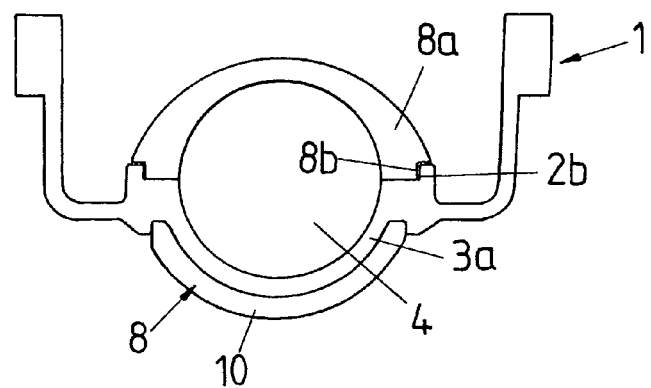
FIG. 1B shows a section along the line A-B of FIG. 1.

In the longitudinal section of FIG. 1 the lower section of a module housing 1 is shown comprising a base 2 and a support 3 for a tubular gas generator 4.

The module housing 1 is furthermore provided with an opening 5 in base 2 which is designed such that the tubular gas generator 4 can be placed from above through the base 2 on the support 3. Two clamp rings 6, 7 are provided for fastening the tubular gas generator 4 to the module housing 1 which are adapted on the inside to the geometry of the tubular gas generator 4. FIG. 1 shows the tubular gas generator 4 after its fastening by the clamp rings 6, 7. Each clamp ring has a middle section 8, an upper extended section 9 and a lower extended section 10. The middle section 8 and the lower extended section 10 of the clamp rings 6, 7 have together a length L which is smaller than the distance of the edges 2a of the base 2 and the edges 3a of the support 3 in direction of the longitudinal axis A of the tubular gas generator 4. The extended sections 9, 10 have a smaller thickness than the middle section 8.

The middle section 8 has at the top an overhang 8a showing in direction of the centre of the tubular gas generator 4 during assembly of the clamp ring. In said overhang a recess 8b is provided which grasps into a protrusion 2b of the base 2. Thus, a twisting of the clamp rings is avoided during assembly.

The assembly of the tubular gas generator 4 occurs in the way that at first the clamp rings 6, 7 are moved onto the tubular gas generator 4 as shown in FIG. 3, wherein the middle section 8 locks approximately with the respective end of the tubular gas generator 4. This allows on the one hand and due to the mentioned length of the sections 8, 10 that the tubular gas generator 4 can be inserted through the opening 5 into the module housing towards the support 3 and on the other hand a grasping of the clamp rings 6, 7 above the base 2 is achieved due to the upper extended section 9. Subsequently, the clamp rings 6, 7 are moved into the direction of the centre of the tubular gas generator 4 so that the extended sections 10 can grasp underneath the support 3. Thereby, the sections 10 are elastically deformed and the tubular gas generator is clamped. Since the sections 9 gasp furthermore above the base 2 of the module housing 1 a sealing between the edges 2a and the extended sections 9 is obtained. The support 3 is designed on its ends such that in clamping position of the clamp rings 6, 7 a sealing effect between the tubular gas generator 4 and the support 3 and in particular its edges 3a is achieved and that the clamp rings 6, 7 have sealing faces against the upper section of the tubular gas generator 4. The sealing faces are formed in a known manner wherein the sealing faces between the edges 2a and the extended sections 9 can also be designed such that a small gap can be present between both of them.

The fastening of the airbag can occur in different manners. For instance, the airbag, which is not shown, can entangle the tubular gas generator 4 so that it is fastened in the clamping position of the clamp rings 6, 7 between the tubular gas generator 4 and the support 3. A vacuum-folded airbag, also not shown, can be fastened in a known manner separately to the module housing 1.

In the arrangement of FIG. 2 a fastening is shown which is modified compared to FIG. 1. Here, the support comprises ends 11 tapering on its outside and thus continuing wedge-shaped in the cross section. In FIG. 2 an end 11 is shown in cross-section. The clamp rings 6, 7 are also tapered inside on the ends 12 facing towards the support so that they also continuing wedge-shaped when looked at in cross-section. In FIG. 2 an end 12 is shown in cross-section. In this embodiment the clamp rings 6, 7 are lowered while moving to the centre of the tubular gas generator 4 due to the wedge-shaped continuation of the ends 11, 12, whereby the tubular gas generator 4 is pressed against the support 3 and is thus clamped.

FIGS. 4 and 5 show the tubular gas generator 4 after its fastening to the module housing 1.

Figure 6:
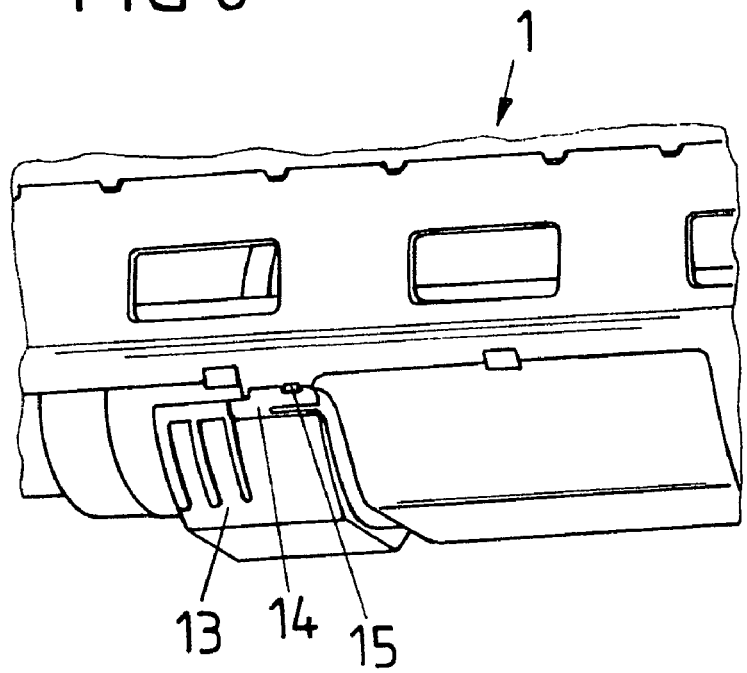
FIG. 6 shows a section of the lower area of the module housing with the clamp ring and an additional locking.
Figure 7:
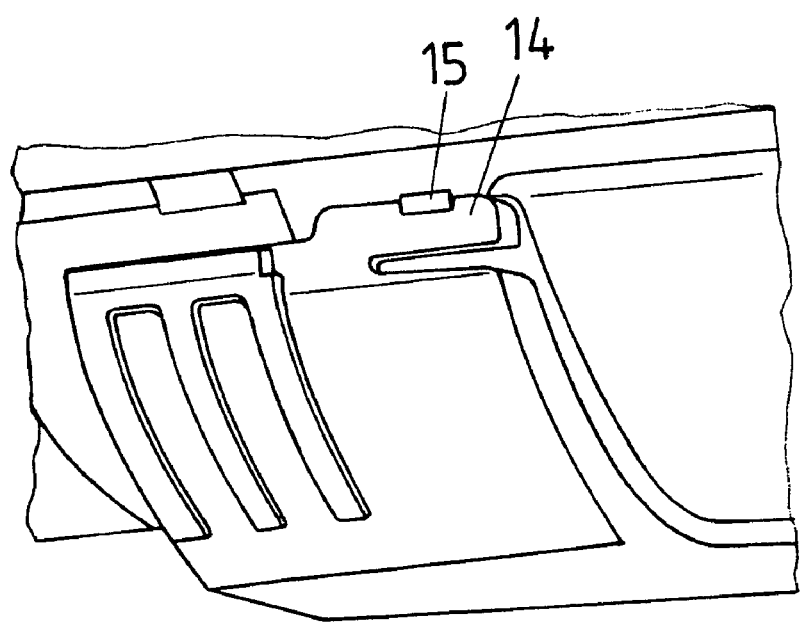
FIG. 7 shows the enlarged display of section according to FIG. 6.

The FIGS. 6 and 7 show a section of the module housing with a further embodiment of a clamp ring. The clamp ring 13 shown here is provided additionally with an elastically deformable latch hook 14 to which a nose 15 is assigned on the module housing 1. The remaining construction of the clamp ring 13 corresponds to one of the previous embodiments. When moving the clamp ring 13 in direction of the centre of the tubular gas generator, which is hidden here, the latch hook 14 is pressed downwards until the nose 15 grasps into a section 16 (FIG. 8) of the latch hook 14. In this position only the latch hook 14 springs back and the clamp ring 13 is blocked. In the FIGS. 6 and 7 only one clamp ring is shown. On the other end of the gas generator, which is not shown in this FIG., a corresponding clamp ring is provided.

Figure 8:
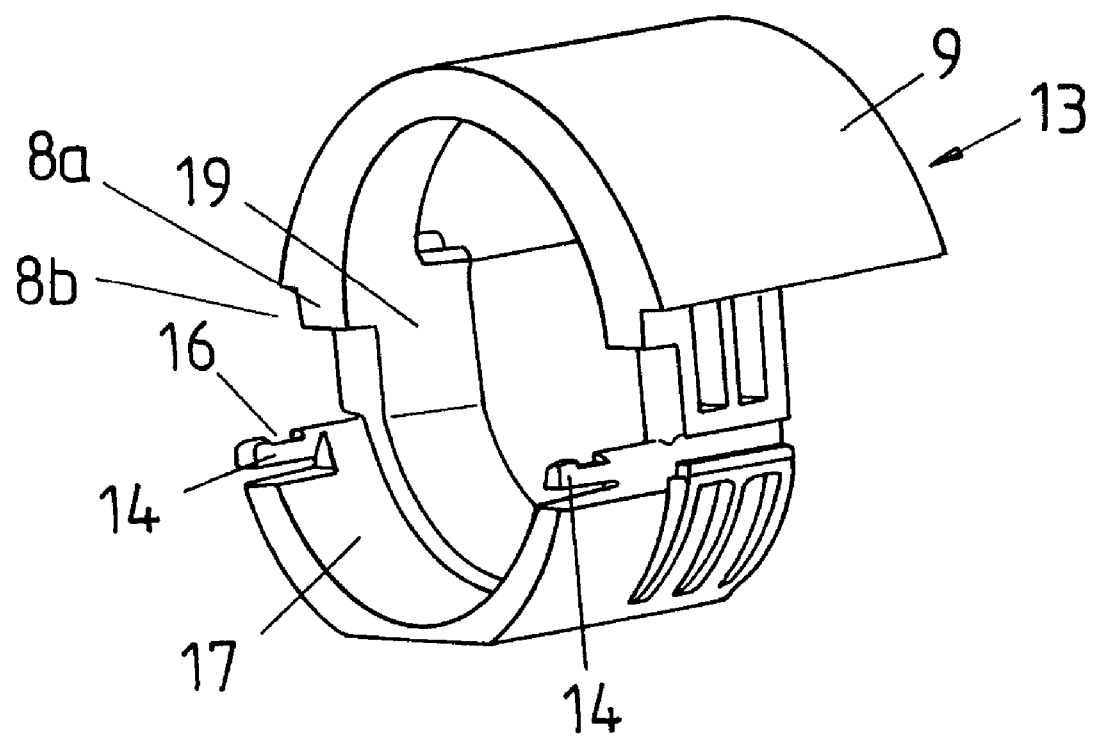
FIG. 8 shows the perspective view of a clamp ring.

In FIG. 8 a single clamp ring with latch hook 14 is shown. It can be seen that two latch hooks 14 are provided on a lower extended section 17. As in the previous embodiments the clamp ring 13 has an extended middle section 19.

The priority application, German Patent Application DE 10 2008 039 181.6, filed Aug. 20, 2008, including the specification, drawings, claims and abstract, is incorporated herein by reference in its entirety.

What is claimed is:

1. An airbag module with an airbag and a module housing, said airbag module comprising:
    a tubular gas generator having gas outlet openings along the periphery thereof;
    two clamp rings; and
    a support for the tubular gas generator provided on said module housing,
    wherein the module housing comprises an opening at a base thereof for introducing the tubular gas generator, said support being disposed below said opening,
    wherein the tubular gas generator is fastened to the module housing using the two clamp rings, said clamp rings each including a first extended section that grasps underneath the support on one side of the clamp ring, and a second extended section that grasps above the base of the module housing on an opposite side of the clamp ring, and
    wherein the support has a smaller length than the tubular gas generator.

2. The airbag module according to claim 1, wherein the clamp rings are adapted to the geometry of the tubular gas generator and the module housing and have extended sections separated from each other in axial direction and continuing axially into the opposite direction.

3. The airbag module according to claim 1, wherein a middle section and the first extended section of the clamp rings assigned to the support have together a length which is smaller than the distance of the edges of the base and the edges of the support in direction of the longitudinal axis of the tubular gas generator.

4. The airbag module according to claim 1, wherein the support has tapered ends and the assigned extended section of the clamp rings so that by moving of the clamp rings in direction of the centre of the tubular gas generator the tubular gas generator can be sandwiched between the support and the upper area of the clamp rings.

5. The airbag module according to claim 1, wherein the extended section of the clamp rings grasping above the base of the module housing has a smaller thickness than a middle section of the clamp rings.

6. The airbag module according to claim 1, wherein the extended section of the clamp rings grasping underneath the support has a smaller thickness than the middle section of the clamp rings.

7. The airbag module according to claim 1, wherein there is a sealing between edges of the base and the clamp rings, between edges of the support and the tubular gas generator and between edges of an overhang of the clamp rings and the tubular gas generator.

8. The airbag module according to claim 1, wherein the clamp rings are interlocked with the module housing.

9. The airbag module according to claim 8, wherein the module housing has at least one latch nose and the clamp ring has at least one assigned deformable latch hook.

10. The airbag module according to claim 8, wherein two latch noses are arranged with an assigned deformable latch hook.

11. The airbag module according to claim 1, wherein the airbag is fastened between the tubular gas generator and the support in the clamping position of the clamp rings.

12. The airbag module according to claim 1, wherein a vacuum-folded airbag is separately fastened to the module housing.

* * * * *